US010458035B2

(12) United States Patent
Harner et al.

(10) Patent No.: US 10,458,035 B2
(45) Date of Patent: Oct. 29, 2019

(54) ANODIZATION OF BONDED ASSEMBLY

(71) Applicant: UNITED TECHNOLOGIES CORPORATION, Farmington, CT (US)

(72) Inventors: John Harner, Vernon, CT (US); John D. Riehl, Hebron, CT (US); William Bogue, Hebron, CT (US); Gary A. Wigell, Lansing, MI (US); Brandon A. Gates, DeWitt, MI (US); Michael A. Morden, Holt, MI (US); Thomas M. Morin, Terryville, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 17 days.

(21) Appl. No.: 15/656,571

(22) Filed: Jul. 21, 2017

(65) Prior Publication Data
US 2019/0024255 A1   Jan. 24, 2019

(51) Int. Cl.
| | |
|---|---|
| C25D 11/12 | (2006.01) |
| B64F 5/40 | (2017.01) |
| C25D 11/02 | (2006.01) |
| C25D 11/08 | (2006.01) |
| C25D 11/26 | (2006.01) |
| F01D 5/28 | (2006.01) |
| F02C 3/04 | (2006.01) |
| C25D 11/04 | (2006.01) |
| C25D 17/00 | (2006.01) |

(52) U.S. Cl.
CPC ............. *C25D 11/12* (2013.01); *B64F 5/40* (2017.01); *C25D 11/022* (2013.01); *C25D 11/04* (2013.01); *C25D 11/08* (2013.01); *C25D 11/26* (2013.01); *C25D 17/005* (2013.01); *F01D 5/288* (2013.01); *F02C 3/04* (2013.01); *F05D 2230/90* (2013.01)

(58) Field of Classification Search
CPC ....... C25D 11/12; C25D 11/04; C25D 11/022; C25D 11/26; C25D 11/08; C25D 17/005; B64F 5/40; F01D 5/288; F02C 3/04; F05D 2230/90
See application file for complete search history.

(56) References Cited

U.S. PATENT DOCUMENTS

| | | | |
|---|---|---|---|
| 3,349,014 A | 10/1967 | Hyter | |
| 3,619,385 A * | 11/1971 | Rjumshina | C25D 11/26 205/121 |

(Continued)

FOREIGN PATENT DOCUMENTS

JP    S5873799    5/1983

OTHER PUBLICATIONS

European Patent Office, European Search Report dated Oct. 26, 2018 in Application No. 18181625.7.

(Continued)

*Primary Examiner* — Louis J Rufo
(74) *Attorney, Agent, or Firm* — Snell & Wilmer, L.L.P.

(57) ABSTRACT

A method for anodizing a bonded assembly may include attaching a first electrode to a first component of the bonded assembly, and forming a first oxide layer on the first component. The bonded assembly may comprise the first component and a second component bonded to the first component. The second component may be electrically isolated from the first component.

18 Claims, 5 Drawing Sheets

(56) References Cited

U.S. PATENT DOCUMENTS

| | | | |
|---|---|---|---|
| 3,772,162 A | 11/1973 | Grune | |
| 4,988,414 A | 1/1991 | Westerman, Jr. | |
| 2010/0155251 A1 | 6/2010 | Bogue et al. | |
| 2010/0159273 A1 | 6/2010 | Filson et al. | |
| 2013/0236712 A1 | 9/2013 | Serafin et al. | |
| 2014/0010663 A1* | 1/2014 | Parkos, Jr. | F01D 5/147 416/241 R |
| 2015/0190893 A1* | 7/2015 | Parkin | B23P 15/04 416/224 |
| 2015/0226067 A1* | 8/2015 | Hyatt | F01D 5/147 416/175 |
| 2016/0017510 A1* | 1/2016 | Jaworowski | C25D 11/12 205/50 |
| 2016/0017725 A1 | 1/2016 | Bogue et al. | |

OTHER PUBLICATIONS

European Patent Office, European Search Report dated Feb. 4, 2019 in Application No. 18181625.7.

* cited by examiner

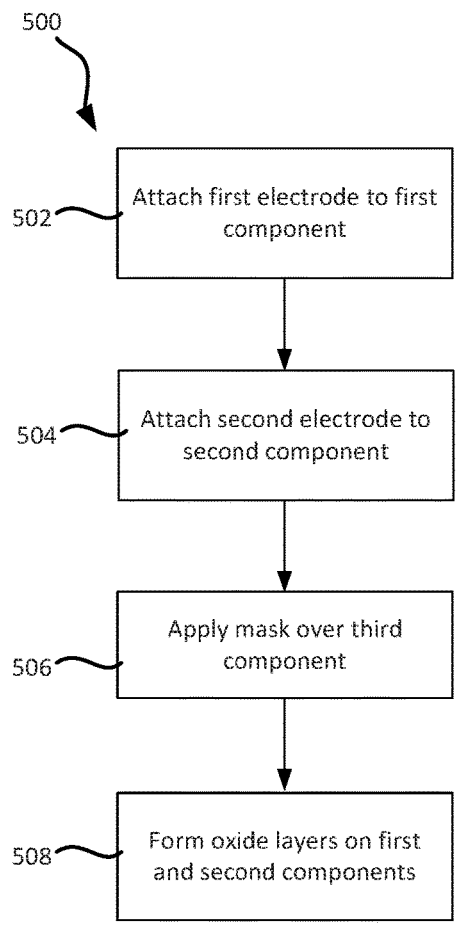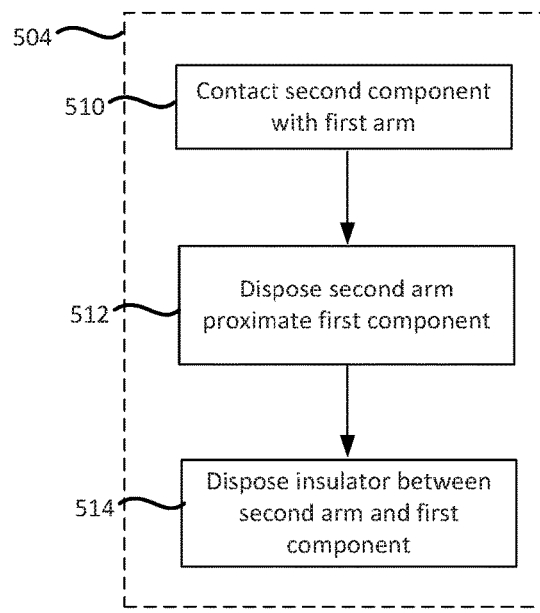
FIG. 3A
FIG. 3B

ANODIZATION OF BONDED ASSEMBLY

FIELD

The present disclosure relates generally to repairing aircraft parts, and more specifically, to anodizing bonded assemblies.

BACKGROUND

Anodization may be used to create an oxide layer or film on the surface of a metal. The oxide layer may provide corrosion resistance and may promote bonding of adhesives or other coatings which may be applied to the metal's surface. For example, an aluminum oxide layer may be formed on an aluminum component to increase the bond strength of adhesives and/or coatings that may be subsequently applied to the aluminum component. In addition, for various reasons, including but not limited to repair, it may be desirable to anodize some or all components of a bonded assembly consisting of similar and/or dissimilar bonded metal components. Bonded assemblies may consist of galvanically-similar and/or galvanically-dissimilar metal components that may be electrically coupled and/or electrically isolated from one another. Current methods for anodizing metal components of a bonded assembly tend to include disassembling the components and anodizing components separately.

SUMMARY

A method of anodizing a bonded assembly is disclosed, in accordance with various embodiments. A method of anodizing a bonded assembly may comprise attaching a first electrode to a first component of the bonded assembly. The bonded assembly may comprise the first component and a second component bonded to the first component. The second component may be electrically isolated from the first component. The method may further comprise attaching a second electrode to the second component of the bonded assembly, and forming a first oxide layer on the first component and a second oxide layer on the second component.

In various embodiments, forming the first oxide layer on the first component and the second oxide layer on the second component may comprise disposing the bonded assembly in an electrolytic solution, coupling the first electrode and the second electrode to a positive power supply terminal, and passing a current through the electrolytic solution. Attaching the second electrode to the second component comprises contacting the second component with a first arm of the second electrode, and disposing an insulator between a second arm of the second electrode and the first component.

In various embodiments, the bonded assembly may further comprise a third component bonded to at least one of the first component or the second component. The method may further comprise applying an insulating mask over the third component. In various embodiments, at least one of the first component or the second component may comprise a first metal, and the third component may comprise a second metal galvanically-dissimilar to the first metal. The first metal may comprise at least one of aluminum or aluminum alloy, and the second metal may comprise at least one of titanium or titanium alloy. In various embodiments, the assembled body may comprise an assembled blade.

A method of anodizing components of a bonded assembly of a turbine engine is disclosed, in accordance with various embodiments. The method may comprise attaching a first electrode to a first component of the bonded assembly, and forming a first oxide layer on the first component of the bonded assembly. The bonded assembly may comprise the first component and a second component bonded to the first component.

In various embodiments, the method may further comprise attaching a second electrode to the second component of the bonded assembly, and forming a second oxide layer over the second component. An adhesive comprising an electrically insulating material may be disposed between the first component and the second component. In various embodiments, forming the first oxide layer may comprise disposing the bonded assembly in an electrolytic solution, coupling the first electrode to a positive power supply terminal, and passing a current through the electrolytic solution. The electrolytic solution may comprise at least one of phosphoric acid, chromic acid, or sulfuric acid.

In various embodiments, the bonded assembly may further comprise a third component bonded to at least one of the first component or the second component. The method may further comprise applying an insulating mask over the third component. At least one of the first component or the second component may comprise a first metal, and the third component may comprise a second metal galvanically-dissimilar to the first metal.

A method of anodizing an assembled blade is disclosed, in accordance with various embodiments. The method may comprise attaching a first electrode to a blade body of the assembled blade. The assembled blade may comprise the blade body, a cover bonded to the blade body, and a sheath bonded to a leading edge of the blade body. The method may further comprise attaching a second electrode to the cover, disposing the assembled blade in an electrolytic solution, and passing a current through the electrolytic solution. The first electrode and the second electrode may be coupled to a positive power supply terminal.

In various embodiments, the method may further comprise applying an insulating mask over the sheath. The blade body and the cover may comprise a first metal, and the sheath may comprise a second metal galvanically-dissimilar to the first metal. Attaching the second electrode to the cover may comprise contacting the cover with a first arm of the second electrode, disposing a second arm of the second electrode proximate a suction side of the blade body, and disposing an insulator between the second arm of the second electrode and the suction side of the blade body.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIGS. 3A and 3B illustrate a method of anodizing a bonded assembly, in accordance with various embodiments;

DETAILED DESCRIPTION

The detailed description of embodiments herein makes reference to the accompanying drawings, which show embodiments by way of illustration. While these embodiments are described in sufficient detail to enable those skilled in the art to practice the inventions, it should be understood that other embodiments may be realized and that logical and mechanical changes may be made without departing from the spirit and scope of the inventions. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Throughout the present disclosure, like reference numbers denote like elements. Accordingly, elements with like element numbering may be shown in the figures, but may not be necessarily be repeated herein for the sake of clarity. As used herein, "distal" refers to the direction outward, or generally, away from a reference component. As used herein, "proximal" and/or "proximate" refers to a direction inward, or generally, towards the reference component.

In various embodiments of the present disclosure, methods for anodizing a bonded assembly are described. A bonded assembly may include a plurality of bonded components that are electrically isolated from one another and/or are comprised of galvanically different materials. The described methods may allow one or more components of the bonded assembly to be anodized without having to first disassemble the bonded assembly.

Figure 1:
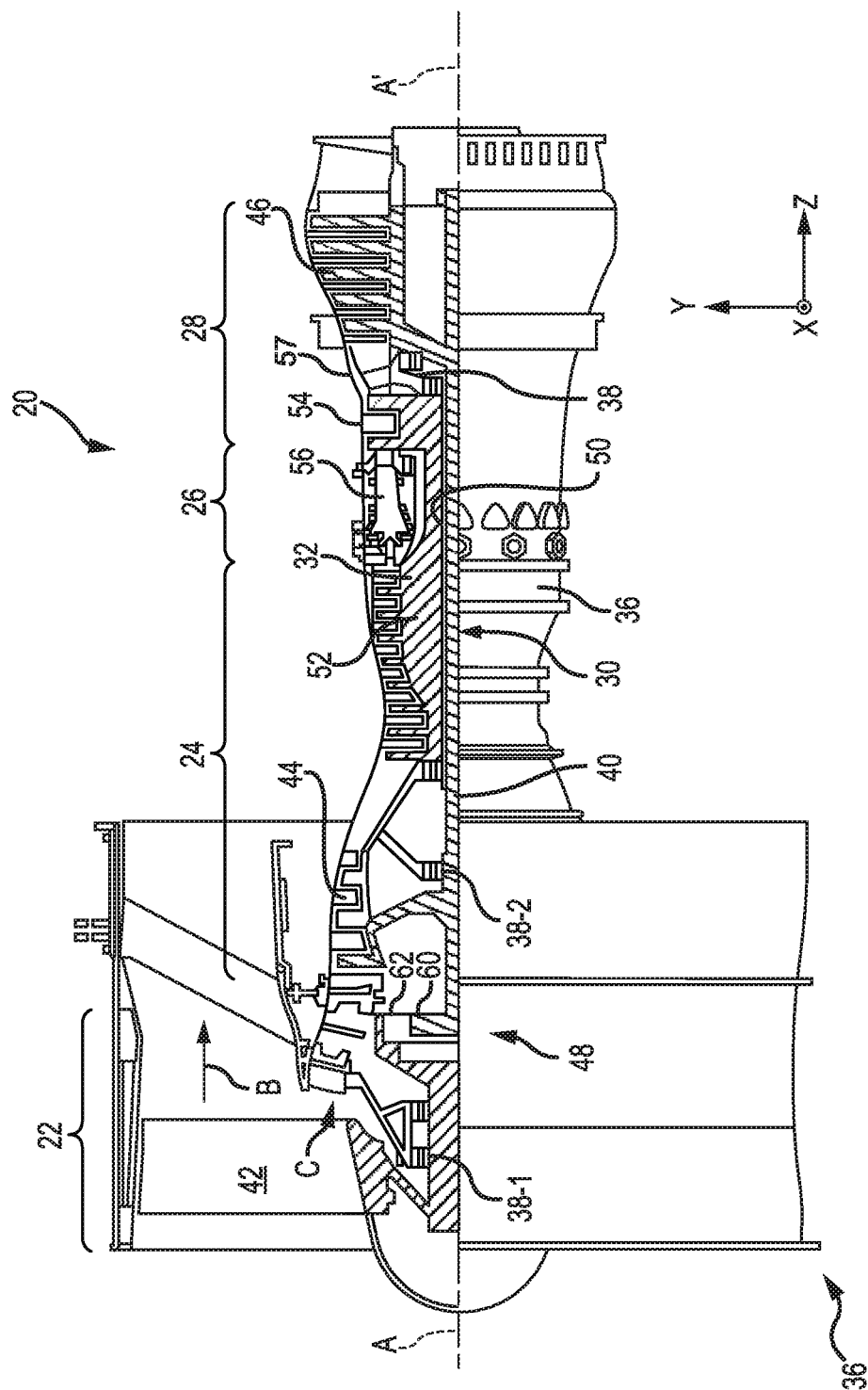
FIG. 1 illustrates a gas turbine engine, in accordance with various embodiments.

With reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive a fluid (e.g., air) along a bypass flow-path B while compressor section 24 can drive fluid along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented along the z-axis on the provided xyz axis. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

The fan section 22, the compressor section 24, and the turbine section 28 may each comprise rotor systems including blade assemblies having one or more sets of rotating blades, which may rotate about engine central longitudinal axis A-A'.

Figure 2A:
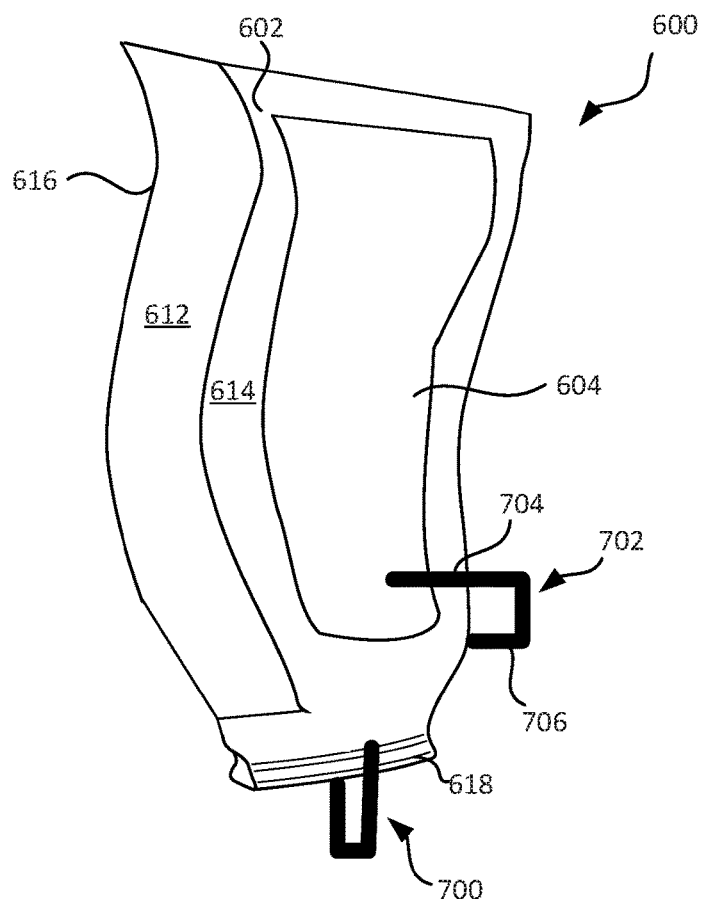
FIGS. 2A and 2B illustrate a perspective view and a plan view, respectively, of electrodes attached to a bonded assembly, in accordance with various embodiments.
Figure 2B:
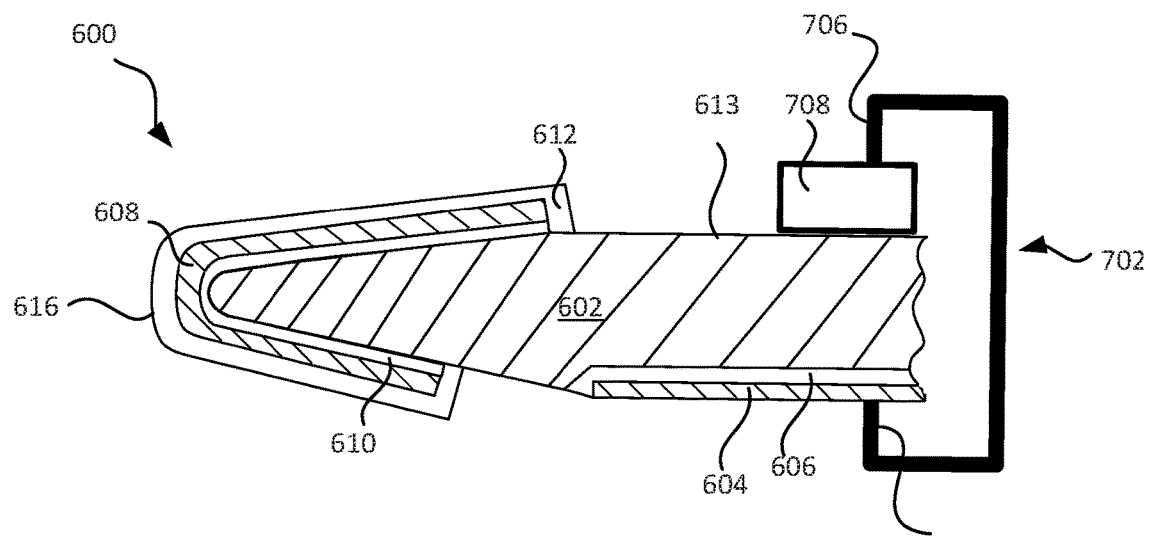

With reference to FIGS. 2A and 2B, a bonded assembly 600 is illustrated, in accordance with various embodiments. Bonded assembly 600 may include a first component 602 and a second component 604 bonded to first component 602. Second component 604 may be bonded to first component 602 using an adhesive 606. In various embodiments, adhesive 606 may comprise, for example, one or more epoxies, bismalemides, cyanate esters, polyurethanes, silicones, or polyimides, and may be a supported or unsupported film and/or paste. Adhesive 606 may comprise an electrically insulating material. Adhesive 606 may thus electrically isolate first component 602 from second component 604.

First component 602 and second component 604 may each be fabricated from a metallic material, such as a metal and/or a metal alloy. In various embodiments, first component 602 and second component 604 may comprise a same or similar material. For example, first component 602 and second component 604 may each comprise aluminum or aluminum alloy.

In various embodiments, bonded assembly 600 may further comprise a third component 608 bonded to first component 602. Third component 608 may be bonded to first component 602 using an adhesive 610. In various embodiments, adhesive 610 may comprise, for example, one or more epoxies, bismalemides, cyanate esters, polyurethanes, silicones, or polyimides, and may be a supported or unsupported film and/or paste. Adhesive 610 may comprise an electrically insulating material. Adhesive 610 may thus electrically isolate first component 602 from third component 608. In various embodiments, third component 608 may be bonded to second component 604.

Third component 608 may be fabricated from a metallic material, such as a metal and/or a metal alloy. In various embodiments, third component 608 may be made of titanium, nickel, or steel (including alloys of any). In various embodiments, first component 602 and second component 604 may be made from a first metallic material, and third component 608 may be made from a second metallic material that is galvanically-dissimilar to the first metallic material. In various embodiments, first component 602 and second component 604 may comprise aluminum or aluminum alloy, and third component 608 may comprise titanium or titanium alloy.

It may be desirable to anodize the metallic surfaces of first component 602 and second component 604. For example, the metallic surfaces of first component 602 and second component 604 may be anodized to promote bonding and/or adhesion of various coatings, primers, and/or adhesives that may be applied to first component 602 and/or second component 604. Stated differently, an oxide layer may be formed on the metallic surfaces of first component 602 and on the metallic surfaces of second component 604. The oxide layer may form chemical bonds with coatings, primers, and/or adhesives applied to first component 602 and/or second component 604, thereby increasing an adhesion strength of the applied materials. In addition, the oxide layer may promote mechanical locking, as the microroughness and porous structure of the oxide layer tends to increase mechanical interlocking with primers subsequently applied to first component 602 and/or second component 604.

FIG. 3A illustrates a method 500 of anodizing a bonded assembly, in accordance with various embodiments. Method 500 may comprise attaching a first electrode to a first component of a bonded assembly (step 502). In various embodiments, method 500 may further comprise attaching a second electrode to a second component of the bonded assembly (step 504).

With combined reference to FIG. 2A and FIG. 3A, step 502 of method 500 may comprise attaching a first electrode 700 to first component 602 of a bonded assembly 600. In various embodiments, first electrode 700 may contact a first portion 618 of first component 602. Step 504 of method 500 may comprise attaching a second electrode 702 to second component 604 of bonded assembly 600. Step 504 may be performed before or after step 502. In various embodiments, step 502 and step 504 may be performed simultaneously.

With reference to FIG. 3B, in various embodiments, step 504 of method 500 may comprise contacting the second component of the bonded assembly with a first arm of the second electrode (step 510), disposing a second arm of the second electrode proximate the first component of the bonded assembly (step 512), and disposing an insulator between the second arm of the second electrode and the first component (step 514).

With combined reference to FIG. 2B and FIG. 3B, in various embodiments, step 510 may comprise contacting second component 604 of bonded assembly 600 with a first arm 704 of second electrode 702. Step 512 may comprise disposing a second arm 706 of second electrode 702 proximate first component 602 of bonded assembly 600. Step 514 may comprise disposing insulator 708 between second arm 706 of second electrode 702 and first component 602. In various embodiments, insulator 708 may be attached or otherwise bonded to second arm 706. Insulator 708 may electrically isolate first component 602 from second electrode 702. Second electrode 702 may clamp against bonded assembly 600, such that first arm 704 and second arm 706 apply pressure in opposing directions against bonded assembly 600. In various embodiments, steps 510, 512, and/or 514 may occur simultaneously. Second arm 706 may be disposed proximate a second portion 613 of first component 602 that is different from the first portion 618 of first component 602 to which first electrode 700 (FIG. 2A) is attached. In various embodiments, bonded assembly 600 may comprise an assembled blade, and second arm 706 may be disposed proximate a suction side 613 of the assembled blade.

Returning to FIG. 3A, in various embodiments, method 500 may include applying a mask over a third component of the bonded assembly (step 506). With combined reference to FIG. 2B and FIG. 3A, step 506 of method 500 may comprise applying a mask 612 over third component 608 of bonded assembly 600. Mask 612 may comprise an electrically insulating material. In various embodiments, mask 612 may comprise a tape, a wax, or other electrically insulating material configured to cover and protect third component 608 from the charged electrolytic solution, as described in further detail below. Mask 612 may be applied prior to or after attaching first electrode 700 and/or second electrode 702. In various embodiments, third component 708 may not need to be masked, as third component 708 may comprise a material that is not affected by the charged electrolytic solution (e.g., third component 708 may comprise a non-metallic material) and/or the fixturing (i.e., the way in which first electrode 700 and second electrode 702 are attached) may alleviate a need for mask 612.

Returning to FIG. 3A, method 500 may further comprise forming an oxide layer on one or more component(s) of the bonded assembly (step 508). In various embodiments, step 508 may comprise forming separate and distinct oxide layers of similar chemistry on a first component and a second component of the bonded assembly.

With combined reference to FIG. 2A and FIG. 3A, step 508 of method 500 may comprise forming separate and distinct oxide layers on first component 602 and second component 604 of bonded assembly 600. For example, a first oxide layer may be formed on first component 602 and a second oxide layer may be formed on second component 604. The oxide layer on first component 602 and the oxide layer on second component 604 may be formed using a phosphoric acid anodization process, a chromic acid anodization process, a sulfuric acid anodization process, or other anodization process as known in the art. For example, in various embodiments, prior to attaching first electrode 700 and second electrode 702, first component 602 and second component 604 may be cleaned, using, for example, acetone and then grit blasted, using, for example, a 240 mesh aluminum grit oxide grit. Alternatively, or in addition, an alkali clean of first component 602 and second component 604 may be performed by, for example, disposing bonded assembly 600 in an agitated alkaline aqueous solution at about 150° F. (65.6° C.) for between 12 to 20 minutes. As used in the preceding sentence only, "about" means±5° F. Bonded assembly 600 may then be rinsed and/or submerged in water (e.g., bonded assembly 600 may be submerged in water for between 1 to 5 minutes). First component 602 and second component 604 may then be power sprayed. After the power spray, first electrode 700 may be attached to first component 602 and second electrode 702 may be attached to second component 604. First component 602 and second component 604 may then be deoxidized by, for example, immersing bonded assembly 600 in an agitated aqueous lye solution at about 85° F. (29.4° C.). As used in the preceding sentence only, "about" means±5° F. A direct current may be applied to the aqueous lye solution. A voltage of the direct current may be increased by 2 volts approximately every 10 seconds until 7.5 volts is attained. Bonded assembly 600 may remain in the deoxidizing aqueous lye solution for about 15 minutes. As used in the preceding sentence only, "about" means±5 minutes. The above described deoxidation technique is merely an example. First component 602 and second component 604 may be deoxidized using an acid deoxidation process or any other suitable deoxidation technique known in the art.

Figure 4:
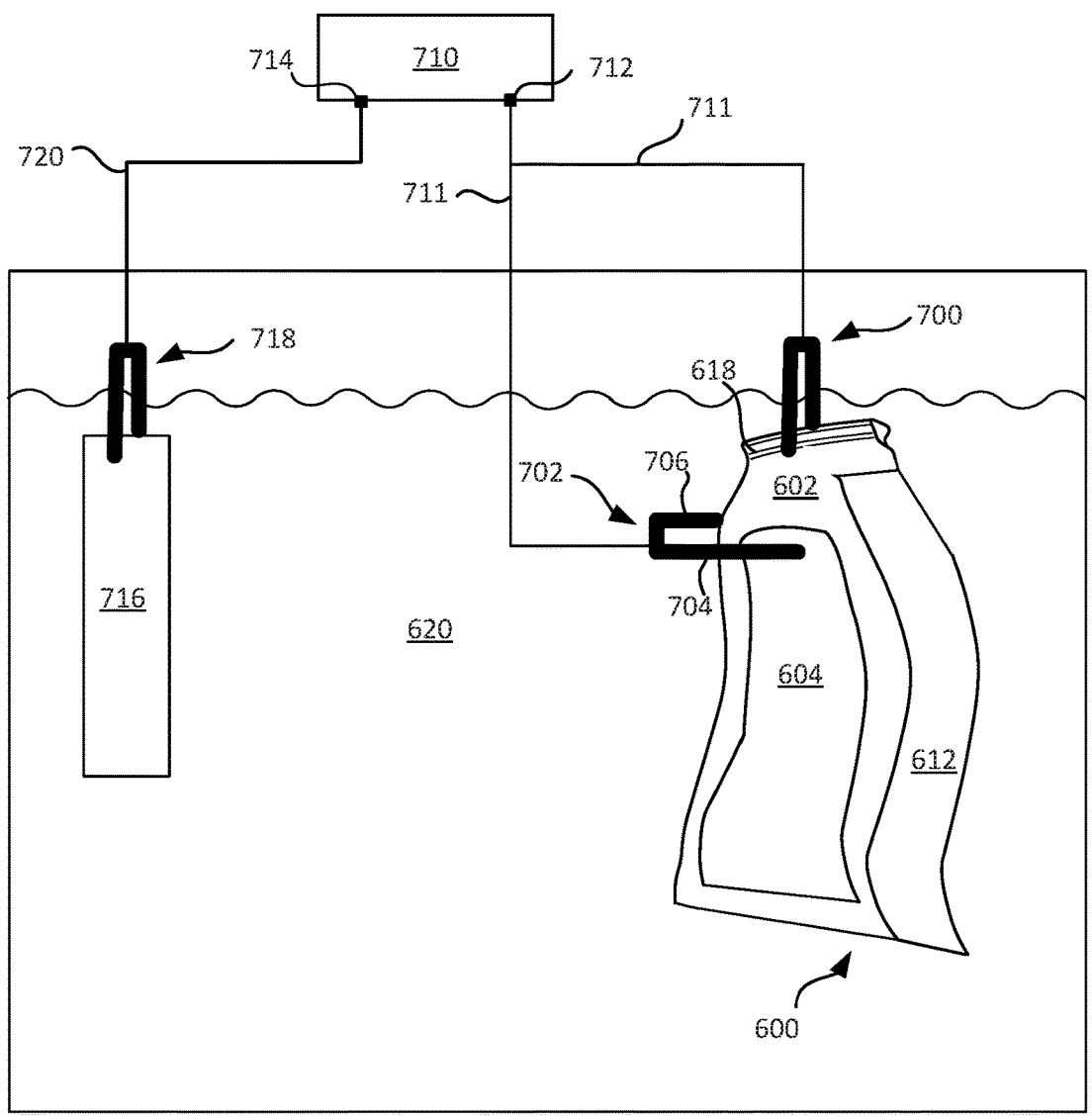
FIG. 4 illustrates anodization of a bonded assembly in an electrolytic solution, in accordance with various embodiments.

Referring to FIG. 4, after deoxidizing, oxide layers may be formed on first component 602 and second component 604 by immersing bonded assembly 600 in an agitated electrolytic solution 620 at about 77° F. (25° C.). As used in the preceding sentence only, "about" means±5° F. The electrolytic solution 620 may comprise phosphoric acid, chromic acid, sulfuric acid, or other suitably electrolytic solution. First electrode 700 and second electrode 702 may be coupled to a direct current power supply 710. First electrode 700 and second electrode 702 may be coupled to a positive direct current power supply terminal 712 of direct current power supply 710 via a wire or other electrical conduit 711. A cathode 716 (e.g., lead) may be electrically connected to a third electrode 718 and may be disposed in electrolytic solution 620 with bonded assembly 600. Third electrode 718 may be coupled to direct current power supply 710. Third electrode 718 may be coupled to a negative direct current power supply terminal 714 of direct current power supply 710, or to an electrical ground, via wire or other electrical conduit 720.

After connecting the first, second, and third electrodes to direct current power supply 710, the direct current power supply is turned on and a direct current is passed through electrolytic solution 620. The voltage of the direct current may be increased by 2 volts approximately every 10 seconds until 15 volts is attained. First component 602 and second component 604 may be anodized for between 15 to 30 minutes. During the anodization, first component 602 and second component 604 may serve as anodes, which may cause a build-up of oxide on the surfaces of first component 602 and second component 604. Stated another way, during the anodization, first component 602 and second component 604 may exhibit a positive charge, which may attract and cause negatively charged ions to react at the components' metal surfaces, thereby creating an oxide layer on first component 602 and an oxide layer on second component 604. With combined reference to FIG. 2B and FIG. 4, during the anodization, mask 612 may electrically insulate third component 608 from electrolytic solution 620, and adhesive 610 may electrically insulate third component 608 from first component 602 and first electrode 700. Masking third component 608 may protect the dissimilar metallic material of third component 608 from the anodization process. Masking third component 608 may also mitigate a risk of arcing between electrically isolated components of bonded assembly 600 and/or reduce charge inhomogeneity where dissimilar materials might be coupled by the anodized solution.

After the anodization, bonded assembly 600 may be rinsed with water, dried in an oven at, for example, about 120° F. (48.9° C.) and then wrapped in paper. As used in the preceding sentence only, "about" means±10° F.

The steps of method 500 may be performed on assembled bonded assembly 600. Stated another way, the steps of method 500 may be carried out with second component 604 and third component 608 bonded to first component 602.

Placing first electrode 700 in contact with first component 602 creates an electrical connection between first component 602 and power supply 710. Placing second electrode 702 in contact with second component 604 creates an electrical connection between second component 604 and power supply 710. Having a dedicated electrode for each of the first component 602 and second component 604 (i.e., first electrode 700 and second electrode 702, respectively) connected to the positive direct current power supply allows first component 602 and second component 604, which are electrically isolated from one another by adhesive 606, to both serve as anodes in the electrolytic solution, and to be anodized while remaining bonded together. Method 500 may thus allow multiple components of bonded assembly 600 to be anodized simultaneously.

In various embodiments, bonded assembly 600 may comprise an assembled blade for use in fan section 22, compressor section 24, or turbine section 28 of engine 20 (FIG. 1). First component 602 may comprise a blade body, second component 604 may comprise a cover bonded to the blade body on a pressure side 614 of the assembled blade, and third component 608 may comprise a sheath bonded to the blade body at a leading edge 616 of the assembled blade.

While bonded assembly 600 may comprise an assembled blade, it should be understood that the anodization method disclosed herein may be used on any bonded assembly. Accordingly, bonded assembly 600 of the present disclosure is not limited to the specific geometry, size, shape, chemical make-up, and/or number of the components shown in the figures.

Figure 5A:
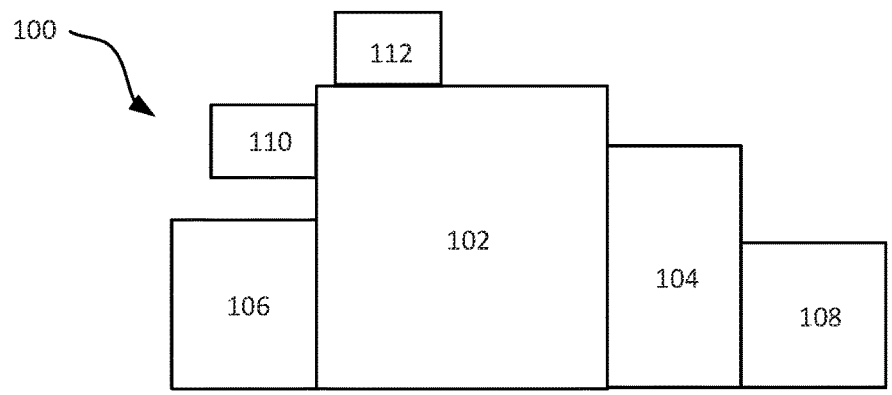
FIG. 5A illustrates a bonded assembly, in accordance with various embodiments.

Referring to FIG. 5A, a bonded assembly 100 is shown, according to various embodiments. Bonded assembly 100 may comprise a first component 102 and any number of subsequent components bonded to the first component 102 or bonded to a component bonded to the first component 102. For example, component 104, component 106, component 110, and component 112 may be bonded to first component 102, and component 108 may be bonded to component 104. The first component 102 may be made from of a first metal, and each of the subsequent components (e.g., components 104, 106, 108, and 110) may comprise either the same metal as the first component 102 or a galvanically-dissimilar metal. Each component of bonded assembly 100 may be electrically-coupled or electrically-isolated from the first component 102. Each component of bonded assembly 100 may be electrically-coupled or electrically-isolated from each of the other components of bonded assembly 100. The components of the bonded assembly 100 may be bonded to one another via adhesives (similar to adhesive 606 of FIG. 2B), welds, or any other suitable bonding method. The bonded assembly 100 may also include any number of bonded non-metallic components. For example, component 112 may be formed from a non-metallic material.

Figure 5B:
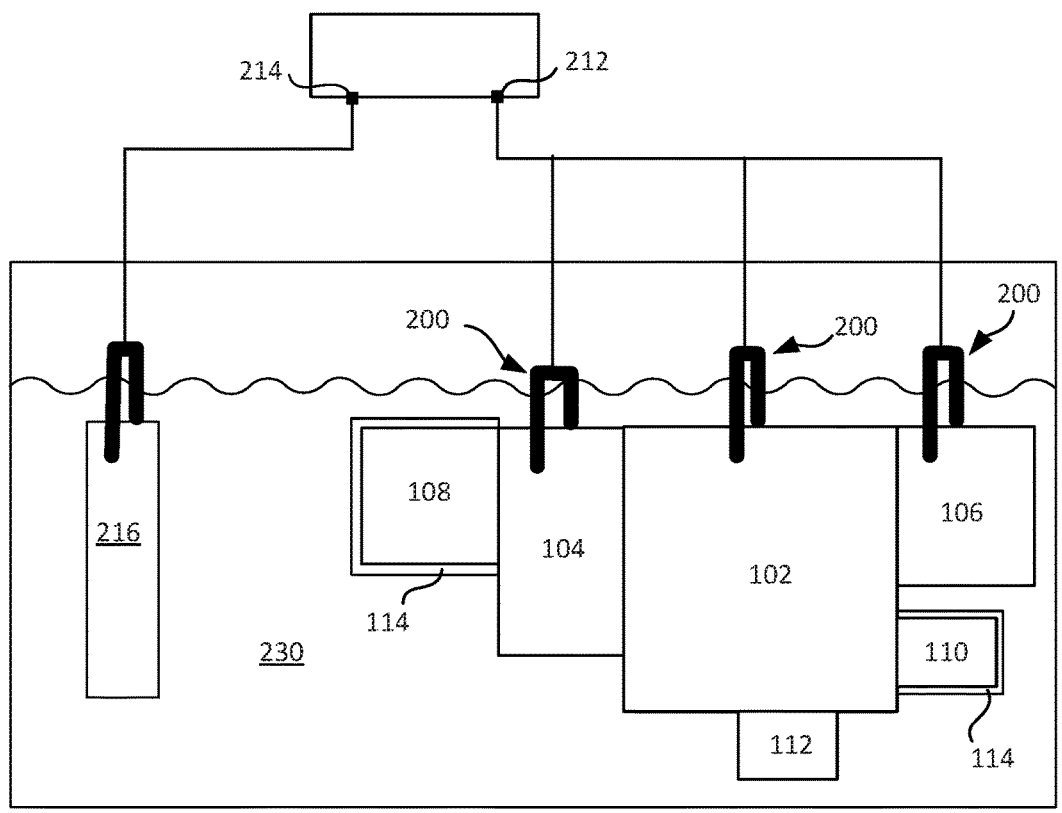
FIG. 5B illustrates anodization of the bonded assembly of FIG. 5A, in accordance with various embodiments.

With reference to FIG. 5B, one or more of the metallic components of the bonded assembly 100 may be anodized by attaching an electrode 200, electrically coupled to a positive power supply terminal 212, to each electrically-isolated component on which an oxide layer is desired. Stated differently, an oxide layer may be formed on any component of the bonded assembly 100 that is electrically coupled to an electrode 200. After attaching the electrode(s) 200 to the one or more components of the bonded assembly 100, the bonded assembly 100 may be disposed in an electrolytic solution 230 along with a cathode 216 that is electrically coupled to a negative power supply terminal 214. A current may be passed through the electrolytic solution 230 and an oxide layer may be formed on each component (e.g., components 102, 104, and 106) of bonded assembly 100 that is electrically coupled to positive power supply terminal 212. A mask 114, similar to mask 612 in FIG. 2B, may be applied over any electrically isolated component (e.g., components 108 and 110) of the bonded assembly 100 on which an oxide layer is not desired. Anodizing one or more components of bonded assembly 100, without first disassembling the bonded assembly 100, may simplify the anodization and/or repair processes, which tends to lead to decreased manufacture and/or repair times and reduced costs.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it may be within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of anodizing a bonded assembly, comprising:
    attaching a first electrode to a first component of the bonded assembly, the bonded assembly comprising:
        the first component,
        a second component bonded to the first component, and
        an adhesive bonding the second component to the first component, wherein the adhesive comprises an electrically insulating material, and wherein the second component is electrically isolated from the first component;
    attaching a second electrode to the second component of the bonded assembly, wherein attaching the second electrode to the second component comprises contacting the second component with a first arm of the second electrode, and disposing an insulator between a second arm of the second electrode and the first component, and wherein the second electrode clamps against the bonded assembly such that the first arm of the second electrode applies pressure against the second component in a first direction and the second arm of the second electrode applies pressure against the first component in a second direction opposite the first direction; and
    forming a first oxide layer on the first component and a second oxide layer on the second component.

2. The method of claim 1, wherein the forming the first oxide layer on the first component and the second oxide layer on the second component comprises:
    disposing the bonded assembly in an electrolytic solution;
    coupling the first electrode and the second electrode to a positive power supply terminal; and
    passing a current through the electrolytic solution.

3. The method of claim 1, wherein the bonded assembly further comprises a third component bonded to at least one of the first component or the second component.

4. The method of claim 3, further comprising applying an insulating mask over the third component.

5. The method of claim 3, wherein at least one of the first component or the second component comprises a first metal, and wherein the third component comprises a second metal galvanically-dissimilar to the first metal.

6. The method of claim 5, wherein the first metal comprises at least one of aluminum or aluminum alloy, and wherein the second metal comprises at least one of titanium or titanium alloy.

7. The method of claim 3, wherein the bonded assembly comprises an assembled blade.

8. A method of anodizing components of a bonded assembly of a turbine engine, comprising:
    attaching a first electrode to a first component of the bonded assembly, the bonded assembly comprising:
        the first component,
        a second component bonded to the first component, and
        an adhesive bonding the second component to the first component, wherein the adhesive comprises an electrically insulating material;
    contacting the second component of the bonded assembly with a first arm of a second electrode;
    locating an insulator between the first component and a second arm of the second electrode; and
    forming a first oxide layer on the first component and a second oxide layer on the second component of the bonded assembly.

9. The method of claim 8, wherein the forming the first oxide layer comprises:
    disposing the bonded assembly in an electrolytic solution;
    coupling the first electrode to a positive power supply terminal; and
    passing a current through the electrolytic solution.

10. The method of claim 9, wherein the electrolytic solution comprises at least one of phosphoric acid, chromic acid, or sulfuric acid.

11. The method of claim 8, wherein the bonded assembly further comprises a third component bonded to at least one of the first component or the second component.

12. The method of claim 11, wherein at least one of the first component or the second component comprises a first metal, and wherein the third component comprises a second metal galvanically-dissimilar to the first metal.

13. The method of claim 11, further comprising applying an insulating mask over the third component.

14. The method of claim 8, wherein the second electrode clamps against the bonded assembly such that the first arm of the second electrode applies pressure against the second component in a first direction and the second arm of the second electrode applies pressure against the first component in a second direction opposite the first direction.

15. A method of anodizing an assembled blade, comprising:
   attaching a first electrode to a blade body of the assembled blade, the assembled blade comprising:
   the blade body,
   a cover bonded to the blade body,
   an adhesive bonding the cover to the blade body, wherein the adhesive comprises an electrically insulating material, and
   a sheath bonded to a leading edge of the blade body;
   contacting the cover with a first arm of a second electrode;
   disposing a second arm of the second electrode proximate a suction side of the blade body; and
   locating an insulator between the second arm of the second electrode and the suction side of the blade body;
   disposing the assembled blade in an electrolytic solution; and
   passing a current through the electrolytic solution, wherein the first electrode and the second electrode are coupled to a positive power supply terminal.

16. The method of claim 15, further comprising applying an insulating mask over the sheath.

17. The method of claim 15, wherein the blade body and the cover comprise a first metal, and the sheath comprises a second metal galvanically-dissimilar to the first metal.

18. The method of claim 15, wherein the second electrode clamps against the assembled blade such that the first arm of the second electrode applies pressure against the cover in a first direction and the second arm of the second electrode applies pressure against the suction side of the blade body in a second direction opposite the first direction.

* * * * *